Patented Feb. 5, 1924.

1,482,929

UNITED STATES PATENT OFFICE.

TREVOR S. HUXHAM, OF BLOOMFIELD, NEW JERSEY, ASSIGNOR, BY MESNE ASSIGNMENTS, TO CARLETON ELLIS, OF MONTCLAIR, NEW JERSEY.

KETONIC RESIN AND PROCESS OF MAKING SAME.

No Drawing.   Application filed September 10, 1921.   Serial No. 499,783.

*To all whom it may concern:*

Be it known that I, TREVOR S. HUXHAM, a citizen of the United States, residing at Bloomfield, in the county of Essex and State of New Jersey, have invented certain new and useful Improvements in Ketonic Resins and Processes of Making Same, of which the following is a specification.

This invention relates to ketone resins and to the process of making same and molded products derived therefrom and relates especially to reactions producing resins from simple ketones of the aliphatic series such as acetone, methyl ethyl ketone, diethyl ketone and higher ketones and also in some cases including ketonic bodies of the aromatic series; the resinification being carried out by the action of formaldehyde or equivalent aldehydic substance in the presence of a suitable condensing agent preferably a basic substance or substance yielding a basic or alkaline activating agent.

The object of the invention is to produce various types of resins which are soluble in available organic solvents and which generally speaking when soluble are fusible and suited for use in the manufacture of shellac substitutes, varnishes, coating compounds, polishes and other purposes to which resins of this general character may be applied in the arts. It is further an object of the invention to produce resins which are substantially infusible, that is do not definitely melt when heated but if raised to a sufficiently high temperature char and burn without liquefying. Resins of this character have important uses as binders in the manufacture of plastic articles or molded objects intended for insulating purposes, articles requiring heat resistance, acid and alkali resistance, and to be insoluble in ordinary organic solvents.

One feature of the ketnoic resin per se is that it exhibits a remarkable degree of resistance to strong alkalies such as caustic alkali. Practically all of the natural resins are very quickly affected by caustic soda or caustic potash and the same is true of many of the synthetic resins such as the well-known phenol formaldehyde condensation products. These synthetic resins are affected by alkalies even in the cold and submergence in a solution of caustic alkali will completely destroy them in the course of a week or ten days. On the other hand the ketonic resins will resist caustic alkali indefinitely and even on boiling the resin in strong caustic soda little or no destructive action takes place. The foregoing does not apply merely to the infusible ketonic resin but also to the soluble and fusible species and this is particularly the case with resins made from acetone or methyl acetone.

The reaction may be carried out by mixing the reacting materials together in the requisite proportions and agitating the solution, allowing the mixture to spontaneously heat to the reaction point which is preferably somewhat above room temperature but preferably not exceeding, at least in the first stages, the boiling point of the ketone. The reaction is a vigorous one and if allowed to progress spontaneously to full extent would dissipate much of the acetone besides causing objectionable foaming or even explosions. By surrounding the reaction vessel with a jacket of water or otherwise cooling and preferably by vigorous agitation the temperature of the reaction mixture may be controlled within suitable bounds so that resinification progresses gradually and properly and a uniform product of a desirable light color may be obtained. Toward the close of the operation the temperature may be permitted to go above the boiling point of the ketone in order to utilize the remaining unacted upon components or to effect a higher degree of resinification or formation of additional or different molecular complexes. For example in case of acetone boiling at 56–58° C. a temperature may be maintained at about 50° or less until a substantial degree of resinification has occurred and the temperature may thereafter be allowed to rise to about 70° C. producing a soluble and fusible resin of a light reddish brown or orange color.

One of the most active condensing agents or activators of the reaction is caustic soda or caustic potash. Ammonium hydroxide is not very suitable for the purpose at least under ordinary pressure because it is too volatile and does not have the same condensing action as the fixed alkalies. Sodium or potassium carbonate or bicarbonate are not especially suited for initiating the reaction but may be used to advantage in final resinification steps. As caustic soda or caustic potash is sometimes objectionable owing to a strong alkaline reaction sodium sulphite may be used in some cases.

As an illustration of one method of forming a soluble fusible ketone resin the following may be cited: 200 grams of methyl acetone were treated with 400 grams of 37% formaldehyde solution (formalin) in the presence of 40 c.c. of 20% alcoholic caustic soda. The mixture was agitated and cooled to prevent the reaction becoming too violent. As the reaction progressed the solution which was light in color became a light brown and increased somewhat in viscosity. Finally resinification progressed to such a stage that the resin which formed separated rendering the mixture turbid. At this point the reaction was stopped by addition of dilute sulphuric acid until the mixture showed a slightly acid reaction. The whole mixture was diluted with several volumes of water and the resin washed with hot water. It was then readily soluble in acetone and was fusible, melting slightly below the boiling point of water. The resin was then heated to 105° C. for about fifteen hours and was then still slightly fusible but was insoluble in all ordinary solvents such as acetone, alcohol, toluol and mixtures of these solvents also insoluble in monochlorbenzol; monochlornaphthalene seems to soften the resin considerably and the resin apparently dissolves some of this solvent because it remained soft at room temperatures. However the resin itself is not soluble in monochlornaphthalene prepared under the conditions set forth.

In referring to resins as soluble it should be understood that the degree of solubility in certain organic solvents constitutes the meaning in which the term is used. For example a resin which I term "soluble acetone resin" may be soluble in acetone or alcohol or in mixtures of these solvents but not necessarily soluble in benzol or toluol. The solubility depends upon the degree of resinification and varies greatly according to the extent of reaction. The initial resin is quite easily soluble in a number of solvents but as resinification progresses solubility in hydrocarbons and alcohol is lost and ketones such as acetone or methyl acetone constitute one of the best solvents for such stage. On further resinification solubility in ketones is lost. Hence by watching the reaction carefully and for example withdrawing samples from time to time, cooling or heating as the case may be to restrain or increase the reaction, the general degree of resinification may be determined at any given period and the reaction arrested at that point if desired either by adding a large volume of water, by cooling, or by adding an acid such as sulphuric, hydrochloric, acetic, boric or other acid.

In another case to 200 grams of methyl acetone were added 40 c.c. of a saturated alcoholic solution of caustic soda. The caustic soda not being readily soluble in the methyl acetone separated to some extent forming a turbid liquid, 200 grams of 37% formalin solution were added the turbidity of the solution then disappearing. The mixture was agitated and it rapidly heated up spontaneously. After a short time the liquid was in a state of ebulition and started to foam over. At this point the receptacle was cooled and the ebulition subsided. Further cooling arrested the reaction and the cooling water was withdrawn thereby allowing the reaction mixture to heat up again, the temperature finally arose to about 70° C. At this point turbidity again was observed, a heavy reddish liquid settling to the bottom. This was composed of the initial resin together with some acetone. At this point two procedures are possible, (1) allow the reaction mixture to cool and the resin to separate completely from the aqueous layer above, draw off the aqueous layer or the resin solution thereby effecting a separation or (2) pour the reaction mixture into a considerable volume of water or add water to the former thereby precipitating the resin in a soft plastic state in which form it may be kneaded in hot water to wash out alkali. In the present invention I preferably allow settling to take place and draw off the aqueous alkaline layer which may be used if desired in further reaction. The heavy viscous resin solution is very soluble if not freed from the acetone associated with it and may be very readily diluted at this stage with further quantities of acetone or other suitable solvent including benzol and other hydrocarbons and a small amount of a suitable acid such as acetic or hydrochloric acid added to precisely neutralize the alkali. The resin in this form is then ready for use as a coating composition and the like or for impregnating suitable fillers to produce compositions intended for molding purposes. The solution also may be used for impregnating paper, cloth or other materials which may be used for various purposes including the formation of dense sheets of insulating materials etc. by hot pressing a plurality of impregnated sheets.

While I prefer to employ aqueous formaldehyde it is also possible to carry out the reaction with paraform and other anhydrous formaldehyde compounds containing reactive aldehydes. In some cases I also may employ acetaldehyde or the para compound. Furfural also may be added in some cases.

As it is frequently an object in making a synthetic resin to obtain a light colored product I preferably employ good clean raw materials and avoid heating the reaction mixture to any unnecessary degree other than is required to accomplish resinification when producing resins or resin solutions intended for use as shellac substitutes.

It may be noted that coating solutions such as I have described made with the ketonic resin are very different from shellac in their resistance to alkali. A surface varnished with shellac is immediately turned purple and destroyed by contact with sodium carbonate, ammonia or caustic alkali whereas a surface coated with the ketonic resin is as indicated, remarkably resistant. This is of advantage when varnishes are used for floors or places where subjected to the action of strongly alkaline soaps or other alkaline solutions. The resin also may be used for coating or lining wooden or other tanks which would be affected by alkaline solution, also as a coating for concrete and cement surfaces.

10 c.c. of saturated alcoholic caustic soda was added to 100 grams of acetone and then 40 grams of paraform were introduced. The reaction commenced almost immediately and ether was added to cool the mixture. The reaction was allowed to proceed slowly until the solution was very viscous and was then placed in an oven at 100° C. and maintained at this temperature over night. A hard resin which was somewhat opaque was obtained. It was then found to be infusible showing that even at 100° C. in the presence of the caustic soda the reaction progressed to form an infusible product.

In another case 100 grams of acetone, 10 c.c. of saturated alcoholic caustic soda and 100 grams of paraform were allowed to react together to produce a thin varnish. At this point a small amount of an alcoholic solution of boric acid was introduced to neutralize the alkali. The solution clouded slightly and the reaction stopped completely. Ammonia gas was introduced and was found to clear the solution but when further heated the reaction of resinification did not continue. More paraform and alcoholic caustic soda was necessary to complete the reaction to an infusible resin. A solution of this resin in acetone afforded a liquid of a light yellow color which could be used as a varnish.

Soluble resins made according to the foregoing process may be used to impregnate a filler such as wood flour or may be admixed with other suitable fillers such as asbestos, china clay, whiting, pigments of various sorts and mineral matter of various descriptions to form a plastic mass capable of being molded into any desired shape under heat and pressure. The molded articles obtained without further transformation of the resin are of course softened by heat and for many purposes articles are required which are resistant to heat. For this purpose therefore it is necessary to cause the resin to react further to obtain the infusible product. This may be carried out in various ways and I shall not attempt to give all the different methods which may be utilized for effecting such transformation.

The filler may be treated with an alcoholic or acetone solution of the soluble resin dried and the material obtained ground to a powder then treated with a slution containing formaldehyde or paraform and caustic soda, sodium sulphite or sodium carbonate. The material is again carefully dried and ground when it is ready to be molded under heat and pressure to form a hard dense substantially infusible article.

Or the solution of the soluble resin may be treated with formaldehyde and alkali or with alkali alone and admixed with the filler. This composition is dried and may then be molded. In other cases a resin which is fusible but not readily soluble may be ground in a ball mill with the filler to secure a thorough commingling. Still another method which is advantageous on account of low cost of handling is mixing on heated rolls. In these methods the resin is thrown on the heated rolls and melted, the resin adhering to the rolls and mixing readily with any fillers, lubricants or fluxes which it may be desirable to add after which the whole mass is stripped off by means of steel blades and is usually run through water-cooled rolls to produce a standard size sheet and at the same time prevent the reaction from being completed before molding.

In making good molded articles from the above resin I find it desirable to add a lubricating agent. Stearic acid or waxy material may be used for the purpose, ordinarily 2-4% being sufficient. For fluxing purposes where the resin does not flow readily in the mold, high boiling point solvents may be used.

I have found that this resin does not have any undesirable action on the steel molds commonly employed in preparing plastic articles. This is of importance as the molds are very expensive and injury thereto by the resin would constitute a serious drawback to its use.

Wood flour is the most useful filling material for the great majority of plastic articles owing to the relative lightness of the finished article in comparison with products made from heavy mineral fillers. The wood flour preferably used should be of low resin content containing not more than 7% water and must not on any account contain metallic or abrasive material. Wood flour from hard woods is used preferably, with as low a bulk as possible. Regarding the fineness I find that 80 mesh 80% fine is desirable for the purpose.

Molding is accomplished in a hardened steel mold such as is employed in the molding of phenol formaldehyde condensation products under a pressure ranging from two to three thousand pounds per square inch or higher. A temperature of from 100° C. to 200° C. may be used, the time of cure decreasing as the temperature is increased. Cooling is advisable but not absolutely necessary. Some of the ketonic resins obtained by the present process are as noted above highly sensitive to heat changing with remarkable speed to infusible products. This is of very great advantage in molding operations as it enables the time of curing to be reduced over that required for many other molding preparations. For example in curing hard rubber an hour or more may be employed in the vulcanizing operation. In molding certain phenol formaldehyde condensation compositions from five minutes to half an hour may be needed depending upon the size of the molded piece and largely on the temperature employed. With the present form of resin (at least with the more sensitive types) articles may be cured to a sufficient degree in one or two minutes in many instances.

As the commonly employed filler namely, wood flour is relatively cheap while the resinous material is substantially more costly it is desirable to use a minimum amount of resinous binder in molding compositions. It is necessary to have enough binder present to cover the particles of filler and form a smooth surface of good finish for most purposes. A mixture of equal parts of resin and wood flour gives a product the surface of which is thoroughly resinous without any roughened appearance or mottled effect due to fibres showing through. With many resinous compositions the flowability and other qualities are such that 50% or more of resinous material may be required thereby adding considerably to the expense of manufacture. With the present resin I may secure molded articles of satisfactory quality in many instances by using much less resin, as for example only 20 or 30%, and thus greatly reduce the cost of the molded article. This ability to use minimum amounts of resin, together with the sensitiveness of the resin to curing thus reducing labor costs, makes my invention of considerable importance in the molding field. My invention therefore also comprises the use of ketonic resins in minimum amounts to produce articles of good surface finish especially embracing compositions containing ordinarily not below 20% or more than 40% of the ketonic resin, the balance of the filler being wood flour or the latter to which has been added some mineral filler such as china clay to modify the texture or surface finish, density etc.

The ketone resin may be incorporated with other resins such as the natural resins of various sorts or with synethetic resins including the phenol-formaldehyde type of resin or resins obtained by reaction of sulphur chloride on phenol, cresol and the like. Wood tar oil forms a resin with sulphur chloride and resins of this general type, namely the sulphur resins, may be incorporated with the resin made according to my process to form various compositions of diversified characteristics. Some of these may be used as varnishes, paints or other coating compositions or may be used in the manufacture of molding powders. I do not lay claim to the sulphur chloride phenol types of resins these being the basis of certain applications for patent by Carleton Ellis.

The foregoing resins may be prepared in so far as possible simultaneously with the production of the ketone resin or may be separately prepared and dissolved in the acetone or other ketone employed and the latter subjected to resinification. In carrying out the process in this way the initial solution may be somewhat viscous due to dissolved resin and especial care should be taken to avoid too vigorous reaction and loss of material by foaming over. The reaction in this case as in the above stated procedures preferably should be carried out in a closed receptacle which may if desired be equipped with a reflux condenser and with a suitable stirring device. It may be jacketed and arranged for the admission of cold or hot water or steam and the reaction may be carried out either by mixing all the ingredients together in complete amount required or the method may be varied by adding the formaldehyde or aldehyde reagent gradually to the acetone or other ketone or vice versa. In a similar manner the activating agent may be incorporated with either of the resinifying substances.

While I have gone into considerable detail in disclosing the processes illustrative of my invention it should be understood that I do not limit myself to any of the precise details set forth, various modifications being possible which fall within the scope of my invention or the equivalency of the claims hereinafter appended.

What I claim is:—

1. The process of making an insoluble and infusible resin which comprises reacting on a soluble and fusible ketone-aldehyde resin with formaldehyde and an alkaline activating agent.

2. The process of making an insoluble and infusible resin which comprises reacting on a soluble and fusible ketone-aldehyde resin with formaldehyde and caustic alkali.

3. The process of making an insoluble and infusible resin which comprises reacting on a soluble and fusible ketone-aldehyde resin with an aldehyde and an alkaline activating agent.

4. The process of making an insoluble and infusible resin which comprises reacting on a soluble and fusible ketone-aldehyde resin with aqueous formaldehyde and caustic alkali.

5. In the process of making ketone-aldehyde resin the steps which comprise agitating an aqueous solution of an aldehyde and a ketone in the presence of an activating agent whereby a resin is formed and reacting upon such resin with formaldehyde in the presence of an alkaline activating agent.

TREVOR S. HUXHAM.